(12) United States Patent
Naito et al.

(10) Patent No.: US 7,122,063 B2
(45) Date of Patent: Oct. 17, 2006

(54) CAPACITOR AND PRODUCTION METHOD OF THE CAPACITOR

(75) Inventors: Kazumi Naito, Chiba (JP); Shoji Yabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 362 days.

(21) Appl. No.: 10/772,305

(22) Filed: Feb. 6, 2004

(65) Prior Publication Data

US 2004/0223291 A1      Nov. 11, 2004

Related U.S. Application Data

(60) Provisional application No. 60/447,134, filed on Feb. 14, 2003.

(30) Foreign Application Priority Data

Feb. 7, 2003 (JP) .............................. 2003-030766

(51) Int. Cl.
- *H01G 9/00* (2006.01)
- *H01G 9/04* (2006.01)
- *H01G 9/145* (2006.01)

(52) U.S. Cl. ...................... 29/25.03; 361/524; 361/528
(58) Field of Classification Search ........ 361/523–529; 29/25.03
See application file for complete search history.

(56) References Cited

U.S. PATENT DOCUMENTS 5,428,500 A * 6/1995 Nishiyama et al. ......... 361/525
6,751,833 B1 * 6/2004 Saito et al. ................ 29/25.42

* cited by examiner

*Primary Examiner*—Eric W. Thomas
(74) *Attorney, Agent, or Firm*—Sughrue Mion, PLLC

(57) ABSTRACT

A method for producing a capacitor which includes, as one electrode, an electrical conductor having formed on the surface thereof a dielectric layer and, as the other electrode, a semiconductor layer, the method including producing fine electrically defective portions in the dielectric layer and forming the semiconductor layer on the dielectric layer by electrification. The capacitor obtained by the method of the present invention has good capacitance appearance factor, low ESR and is excellent in reliability.

20 Claims, No Drawings

CAPACITOR AND PRODUCTION METHOD OF THE CAPACITOR

CROSS REFERENCE TO THE RELATED APPLICATIONS

This is an application filed pursuant to 35 U.S.C. Section 111(a) with claiming the benefit of U.S. Provisional application Ser. No. 60/447,134 filed Feb. 14, 2003 under the provision of 35 U.S.C. Section 111(b), pursuant to 35 U.S.C. Section 119(e)(1).

TECHNICAL FIELD

The present invention relates to a capacitor having good capacitance appearance factor, low equivalent series resistance (ESR) and excellent reliability, and a production method of the capacitor.

BACKGROUND ART

For example, the capacitor in the periphery of CPU (Central Processing Unit) used for personal computers and the like is required to generate little heat at the passing of a high ripple current, suppress the fluctuation of voltage, and have a high capacitance and low ESR. In general, a plurality of aluminum solid electrolytic capacitors or tantalum solid electrolytic capacitors are used by disposing these in parallel.

This solid electrolytic capacitor comprises an aluminum foil having fine pores in the surface layer or a tantalum sintered body having fine pores in the inside, which is used as one electrode, a dielectric layer formed on the surface layer of the electrode, and the other electrode (usually a semiconductor layer) provided on the dielectric layer.

When all pore surfaces of the one electrode are covered up by the semiconductor of the other electrode, the expected capacitance as the capacitor of the one electrode can be 100% satisfied. However, not only a lot of time is necessary for covering nearly 100% of the semiconductor but also thermal stress is imposed on the element due to heat of soldering on mounting the produced capacitor on a substrate by soldering and the leakage current value (hereinafter sometimes referred to as an LC value) is increased in some cases.

DISCLOSURE OF THE INVENTION

As a result of intensive investigations, the present inventors have found out a method for forming a semiconductor layer capable of maintaining nearly 100% of the capacitance expected from the pore surface area of one electrode and suppressing the increase of LC after mounting, in a relatively short time. The present invention has been accomplished based on this finding.

That is, the present invention relates to a method for producing a capacitor, a capacitor produced by the method and electronic devices using the capacitor, which are described below.

1. A method for producing a capacitor comprising, as one electrode, an electrical conductor having formed on the surface thereof a dielectric layer and, as the other electrode, a semiconductor layer, the method comprising producing fine electrically defective portions in the dielectric layer so as to make dielectric layer have the LC value of 500 µA/m² or less per surface area of the electrical conductor and forming the semiconductor layer on the dielectric layer by electrification.

2. The method for producing a capacitor as described in 1 above, wherein the electrical conductor is at least one member selected from a metal, an inorganic semiconductor, an organic semiconductor and carbon.

3. The method for producing a capacitor as described in 1 above, wherein the electrical conductor is a laminate with a surface layer being at least one member selected from a metal, an inorganic semiconductor, an organic semiconductor and carbon.

4. The method for producing a capacitor as described in 1 above, wherein the semiconductor is at least one semiconductor selected from an organic semiconductor and an inorganic semiconductor.

5. The method for producing a capacitor as described in 1 above, wherein the dielectric material is at least one dielectric material selected from a metal oxide and a polymer.

6. The method for producing a capacitor as described in 5 above, wherein the metal oxide can be obtained by electrochemical formation of an electrical conductor comprising a metal element.

7. The method for producing a capacitor as described in 1 above, wherein the fine electrically defective portions formed in the dielectric layer are produced by bringing the electrical conductor having formed on the surface thereof a dielectric layer into contact with a corrosive gas or liquid capable of corroding the dielectric layer.

8. The method for producing a capacitor as described in 7 above, wherein the corrosive gas is a halogen gas, an acid or alkali component-containing water vapor, air, nitrogen or argon gas.

9. The method for producing a capacitor as described in 7 above, wherein the corrosive liquid is a solution obtained by incorporating a halogen component or an acid or alkali component into water or an organic solution.

10. The method for producing a capacitor as described in 1 above, wherein the fine electrically defective portions formed in the dielectric layer are produced by attaching fine contacts to the electrical conductor having formed on the surface thereof a dielectric layer.

11. The method for producing a capacitor as described in 10 above, wherein the fine contact is at least one member selected from a metal oxide, a salt, a transition element-containing inorganic compound, a transition element-containing organic compound and a polymer compound.

12. The method for producing a solid electrolytic capacitor as described in 4 above, wherein the organic semiconductor is at least one selected from an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

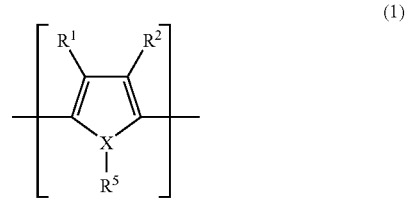

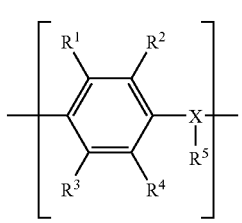

(2)

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs of $R^1$ and $R^2$, and $R^3$ and $R^4$ may combine with each other to form a ring structure.

13. The method for producing a solid electrolytic capacitor as described in 12 above, wherein the polymer containing a repeating unit represented by formula (1) is a polymer containing a structure unit represented by the following formula (3) as a repeating unit:

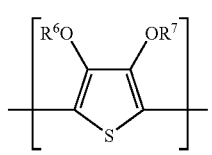

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

14. The method for producing a solid electrolytic capacitor as described in 12 above, wherein the polymer is selected from polyaniline, polyoxyphenylene, polyphenylene sulfide, polythiophene, polyfuran, polypyrrole, polymethylpyrrole, and substitution derivatives and copolymers thereof.

15. The method for producing a solid electrolytic capacitor as described in 14 above, wherein the polymer is poly(3,4-ethylenedioxythiophene).

16. The method for producing a solid electrolytic capacitor as described in 4 above, wherein the inorganic semiconductor is at least one compound selected from molybdenum dioxide, tungsten dioxide, lead dioxide and manganese dioxide.

17. The method for producing a solid electrolytic capacitor as described in 1 above, wherein the semiconductor has an electrical conductivity of $10^{-2}$ to $10^3$ S/cm.

18. A capacitor produced by the production method described in any one of 1 to 17 above.

19. An electronic circuit using the capacitor described in 18 above.

20. An electronic device using the capacitor described in 18 above.

One embodiment of the method for producing a capacitor of the present invention is described.

Examples of the electrical conductor for use in the capacitor of the present invention include a metal, an inorganic semiconductor, an organic semiconductor, a carbon, a mixture containing at least one of these members, and a laminate having laminated on the surface layer thereof such an electrical conductor.

Preferred examples of the metal include aluminum, iron, nickel, tantalum, copper, niobium, tin, zinc, lead, titanium, zirconium and manganese. Examples of the inorganic semiconductor include metal oxides such as lead dioxide, molybdenum dioxide, tungsten dioxide, niobium monoxide, tin dioxide and zirconium monoxide. Examples of the organic semiconductor include electrically conducting polymers such as polypyrrole, polythiophene, polyaniline and substitution product or copolymer having such a polymer skeleton, and low molecular complexes such as complex of tetracyanoquinodimethane (TCNQ) and tetrathiotetracene, and TCNQ salt. Examples of the laminate body having laminated on the surface layer thereof the above-described electrical conductor include laminates obtained by laminating the electrical conductor on paper, insulating polymer, glass, etc.

In the case of using a metal as the electrical conductor, a part of the metal may be subjected to at least one treatment selected from carbidation, phosphation, boronation, nitridation and sulfidation before use.

Examples of the shape of the electrical conductor include a foil, a plate, a bar and a shape after the electrical conductor itself is formed into a powder and molded or molded and then sintered. The surface of the electrical conductor may be treated, for example, by etching to have fine pores. In the case of a shape after the electrical conductor itself is formed into a powder and molded or molded and then sintered, fine pores can be produced in the inside of the molded or sintered article by selecting an appropriate molding pressure. Also, in the case of a shape after the electrical conductor itself is formed into a powder and molded or molded and then sintered, a separately prepared outgoing lead wire may be inserted at the molding and molded together with the electrical conductor and the outgoing lead wire portion may be used as the outgoing lead of one electrode of the capacitor.

Examples of the dielectric layer formed on the surface of the electrical conductor of the present invention include a dielectric material which comprises at least one member selected from metal oxides or polymer. The specific examples include a dielectric layer mainly comprising (in an amount of 50 mass % or more) at least one member selected from metal oxides such as $Ta_2O_5$, $Al_2O_3$, $Zr_2O_3$ and $Nb_2O_5$, and a dielectric layer for use in ceramic capacitors or film capacitors. In the case of the former dielectric layer mainly comprising at least one member selected from metal oxides, when the dielectric layer is formed by electrochemically forming the electrical conductor having a metal element of the metal oxide, the produced capacitor has a polarity and this is an electrolytic capacitor. Examples of the dielectric layer to be used in a ceramic capacitor or film capacitor include a dielectric layer comprising a fluororesin, a polyester-base resin or the like disclosed in JP-A-63-29919 (the term "JP-A" as used herein means an "unexamined published Japanese patent application") filed by the present applicant and the one comprising perovskite compounds or the like described in JP-A-63-34917. The dielectric layer mainly comprising at least one member selected from metal oxides or the dielectric layer to be used in a ceramic capacitor or film capacitor may be used by laminating the layers multiply. Also, the dielectric layer may be a mixture of the dielectric layer mainly comprising at least one member selected from metal oxides and the dielectric layer conventionally known in the field of ceramic capacitor or film capacitor.

Examples of the other electrode for use in the capacitor of the present invention include at least one compound selected from an organic semiconductor and an inorganic semiconductor.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

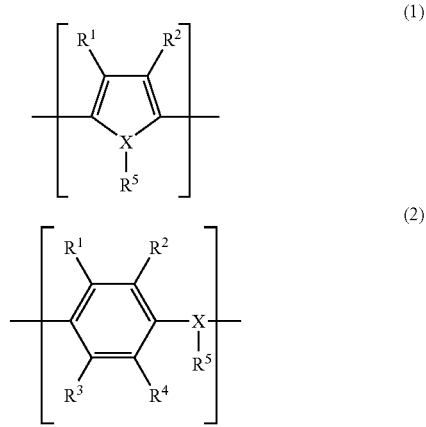

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a ring structure.

Preferred examples of the electrically conducting polymer containing a repeating unit represented by formula (1) for use in the present invention include an electrically conducting polymer containing a structure unit represented by the following formula (3) as a repeating unit:

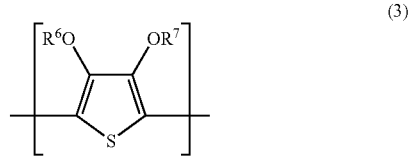

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position. The ring structure includes a structure having a vinylene bond which may be substituted, and a phenylene structure which may be substituted.

The electrically conducting polymer containing such a chemical structure is being electrically charged and a dopant is doped therein. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide.

When the organic or inorganic semiconductor used has an electrical conductivity of $10^{-2}$ to $10^3$ S/cm, the capacitor produced can have a small ESR value and this is preferred.

In the present invention, the method for forming this semiconductor layer on the above-described dielectric layer is producing fine electrically defective portions in the dielectric layer and then forming the semiconductor layer by electrification. The fine electrically defective portion may be produced in the dielectric layer by bringing the dielectric layer into contact with a gas (corrosive gas) or liquid (corrosive liquid) capable of corroding the dielectric layer, preferably a corrosive gas, during or after the formation of the dielectric layer, by attaching a plurality of fine contacts to the dielectric layer, or by performing these operations in combination. Forming the fine electrically defective portion can be regulated by adjusting the concentration of the substance to be brought into contact with or attached to the dielectric layer, the contacting time and the number of times of forming operations. Here, in the present invention, the fine electrically defective portion is regarded as being formed when increase of the LC value (electrical deterioration) is confirmed after the above-described operation.

Representative examples of the corrosive gas include at least one of a halogen gas and a gas obtained by incorporating an acid or alkali component into water vapor, air, nitrogen gas or argon gas. Representative examples of the corrosive liquid include a solution obtained by incorporating a halogen component or an acid or alkali component into water or an organic solution such as alcohol.

The optimal concentration of the corrosive gas or liquid and the optimal contacting time with the dielectric layer vary depending on the size of an element, the pore size and the pore depth and these are determined by previously performing a preliminary test. By contacting the dielectric layer with a corrosive gas or liquid, fine electrically defective portions are formed in the dielectric layer.

Examples of the plurality of fine contacts attached to the dielectric layer include at least one material selected from inorganic and organic materials. Examples of the inorganic material include inorganic compounds containing a metal oxide, a salt or a transition element. Examples of the organic material include organic compounds and polymer compounds each containing a salt or a transition element. The inorganic or organic material may be an insulating material, a semiconductor or a conducting material, but in order to reduce the ESR value of the produced capacitor, a semiconductor or conducting material having an electrical conductivity of $10^{-2}$ S/cm to $10^3$ S/cm is preferred. If fine contacts cover the entire surface of the dielectric layer, the electrical deterioration becomes excessively large and this is not preferred. By contacting the inorganic or organic material with the electrical conductor having on the surface thereof the dielectric layer, a plurality of fine contacts can be provided on the dielectric layer. When the inorganic or organic material is a solid, for example, this material may be dissolved in an appropriate solvent and then contacted with the dielectric layer and the solvent may be later evaporated and dried out. Alternatively, a sol having dispersed therein fine contacts may be used in place of the solution. Also, the inorganic or organic material precursor may be reacted on the electrical conductor to form fine contacts. The size of the fine contact is preferably smaller than the pore size of the electrical conductor. Due to the presence of fine contacts on the dielectric layer, electrical deterioration is generated in the dielectric material. Usually, the degree of electrical deterioration in the dielectric layer is not greatly changed unless the dielectric layer is repaired as described later.

The degree of electrical deterioration in the dielectric layer can be judged by dipping the electrical conductor having formed on the surface thereof the dielectric layer in an electrolytic solution and measuring the leakage current (LC) value of the dielectric layer per surface area of the electrical conductor. When the electrical deterioration is generated in the dielectric layer and the LC value is made to be 500 µA/surface area ($m^2$) of the electrical conductor or less, preferably 100 µA/surface area ($m^2$) of the electrical conductor or less, more preferably 30 µA/surface area ($m^2$) of the electrical conductor or less, the semiconductor layer can be relatively cleanly formed by the electrical technique described later without locally forming a lump of the semiconductor layer and the coverage of the semiconductor layer increases, as a result, the produced capacitor can have a good LC value. In order to adjust the LC value of the dielectric layer to a desired range, the dielectric layer may be repaired after the completion of electrical deterioration in the dielectric layer.

The repairing method includes a method of dipping the electrical conductor having the dielectric layer after deterioration in a separately prepared electrolytic solution and turning electricity on the conductor. The kind and temperature of the electrolytic solution, the repairing time and the like can be previously determined by performing a preliminary test.

In the present invention, after fine electrical defective portions are produced in the dielectric layer, the above-described semiconductor layer is formed on the dielectric layer by electrification. Examples of the electrification include a method of dipping the electrical conductor having thereon a dielectric layer where fine electrical defective portions are formed, in a solution having dissolved therein a semiconductor precursor which works out to a semiconductor after electrification, and applying a voltage between the electrical conductor as an electrode and a separately prepared electrode, thereby forming the semiconductor layer. During the electrification, the electrical conductor may be pulled out from the solution, washed, dried and then dipped in an electrolytic solution having dissolved therein an acid or a salt and a voltage may be applied so as to repair the fine defects caused by electrification in the electrical conductor. Also, this operation of pulling out and repairing may be repeated multiple times.

In the capacitor of the present invention, an electrode layer may be provided on the semiconductor layer formed by the above-described method or the like so as to attain good electrical contact with an external outgoing lead (for example, a lead frame).

The electrode layer may be formed, for example, by the solidification of electrically conducting paste, plating, vapor deposition of metal, or formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the other electrode and then, the entirety is sealed with a material such as epoxy resin, thereby fabricating a capacitor. This capacitor may have a lead comprising a metal wire previously or afterward connected to the electrical conductor.

The capacitor having such a constitution of the present invention is jacketed, for example, by resin mold, a resin case, a metallic jacket case, resin dipping or a laminate film and thereby, can be completed as a capacitor product for various uses.

The capacitor produced in the present invention can be preferably used, for example, for circuits using a high-capacitance capacitor, such as electric power circuit. These circuits can be used in various digital devices such as personal computer, server, camera, game machine, DVD equipment, AV equipment and cellular phone, and electronic devices such as various electric power sources. The capacitor produced in the present invention is low in the leakage current after mounting and therefore, by using this capacitor, electronic circuits and electronic devices having less initial failure can be obtained.

BEST MODE FOR CARRYING OUT THE INVENTION

The present invention is described in greater detail below by referring to Examples. However, the present invention is not limited to these Examples.

An electrical conductor having formed on the surface thereof a dielectric layer is dipped in an electrolytic solution comprising an aqueous 0.1% phosphoric acid solution (when the electrical conductor is not aluminum) or an aqueous 20% ammonium adipate solution (when the electrical conductor is aluminum) and then the leakage current (LC) value used for judging the degree of electrical deterioration in the dielectric layer is a value determined at room temperature for 1 minute after a voltage of 16 V (when the electrical conductor is not aluminum) or 7 V (when the electrical conductor is aluminum) is applied.

The amount of a plurality of fine contacts attached to the dielectric layer for use in the present invention is calculated from the area ratio between the dielectric layer and the fine contacts in an SEM (scanning electron microscope) photograph.

The coverage of the semiconductor layer on the dielectric layer is a relative value when the capacitance determined by using an electrolytic solution (an aqueous 30% sulfuric acid solution (when the electrical conductor is not aluminum) or an aqueous 30% ammonium adipate solution (when the electrical conductor is aluminum)) as the other electrode in place of the semiconductor layer is assumed to be 100%.

The capacitor produced was solder-mounted under the conditions of having the capacitor pass three times through a reflow furnace having a peak of 260° C. The LC after the mounting was measured at 4 V for 30 seconds. Each measured value is an average of n=30 units.

EXAMPLE 1

By using 0.12 g of tantalum powder having CV (product of capacitance and electrochemical forming voltage) of 80,000/g, a sintered body in a size of 4.0×3.2×1.7 mm was produced (sintering temperature: 1,340° C., sintering time: 30 minutes, density of sintered body: 5.5 g/cm$^3$, Ta lead wire: 0.29 mmφ). The sintered body excluding a part of the lead wire was dipped in an aqueous 0.1% phosphoric acid solution and electrochemically formed at 80° C. for 3 hours by applying a voltage of 20 V between the sintered body and a Ta plate electrode as a cathode to form a dielectric layer comprising $Ta_2O_5$. This sintered body was left standing for 5 hours in a sulfuric acid-containing water vapor obtained by boiling an aqueous 30% sulfuric acid solution to produce fine electrical defective portions in the dielectric layer. The LC value of the dielectric layer having fine defective portions was 20 μA/m$^2$.

Then, the sintered body was dipped in an aqueous 10% lead acetate solution and a voltage of 16 V was applied between the sintered body as an anode and a separately prepared platinum electrode as a cathode at room temperature for 24 hours to form a semiconductor layer mainly comprising lead dioxide. The resulting sintered body was pulled out, washed and dried and thereafter, a voltage of 16 V was applied by using the sintered body as an anode and a platinum electrode as a cathode at 80° C. for 30 minutes to repair the fine defects in the dielectric layer and give an LC value of 20 μA/m$^2$. After repeating the operation of forming the semiconductor and repairing the dielectric layer 4 times (in the forth time, a voltage to give a final LC value of 7 μA/element was applied), the sintered body was washed and dried and the formation of the semiconductor layer as another electrode was completed. Furthermore, carbon paste and silver paste were stacked in this order.

On two protruded parts of a separately prepared lead frame having a tin-plated surface, the lead wire of the sintered body was placed in the positive electrode side and the silver paste side of the sintered body was placed in the negative electrode side. The former was connected by spot welding the latter was connected by silver paste to the sintered body. Thereafter, the entirety excluding a part of the lead frame was molded with an epoxy resin (the lead frame was cut and bent at predetermined portions out of the resin mold) to produce a chip capacitor having a size of 7.3×4.3× 2.8 mm.

EXAMPLES 2 TO 6 AND COMPARATIVE EXAMPLE 1

Capacitors were produced in the same manner as in Example 1 except for changing the initial LC value in Example 1 to 40, 80, 100, 200, 400 and 600 μA/m$^2$ in Examples 2, 3, 4, 5 and 6 and Comparative Example 1 respectively, by extending the period to leave the sintered body standing in a sulfuric acid-containing water vapor.

EXAMPLE 7

A capacitor was produced in the same manner as in Example 1 except for using a 1:1 mixture of sulfuric acid and nitric acid (each a 20% aqueous solution) in place of the sulfuric acid solution in Example 1 and changing the initial LC value to 12 μA/m$^2$ and the final LC value to 5 μA/element.

EXAMPLE 8

By using 0.15 g of niobium powder having CV of 65,000/g, a sintered body in a size of 4.1×3.4×1.8 mm was produced (sintering temperature: 1,620° C., sintering time: 30 minutes, density of sintered body: 6.0 g/cm$^3$, Nb lead wire: 0.29 mmφ). The sintered body excluding a part of the lead wire was dipped in an aqueous 0.1% phosphoric acid solution and electrochemically formed at 80° C. for 3 hours by applying a voltage of 20 V between the sintered body and a Ta plate electrode as a cathode to form a dielectric layer comprising $Nb_2O_5$. This sintered body was left standing at 20° C. for 7 hours in a chlorine gas diluted to 10% with nitrogen gas to produce fine electrical defective portions in the dielectric layer. The LC value of the dielectric layer having fine defective portions was 9 μA/m$^2$. Then, the sintered body was dipped in an aqueous solution containing 0.2% ethylenedioxythiophene and 0.1 M anthraquinonesulfonic acid and a voltage of 16 V was applied between the sintered body and a platinum electrode as a cathode at room temperature for 24 hours to form a semiconductor layer mainly comprising an ethylenedioxythiophene polymer. The resulting sintered body was pulled out, washed and dried and then a voltage of 16 V was applied by using the sintered body as an anode and a platinum electrode as a cathode at 80° C. for 30 minutes in an aqueous 0.1% acetic acid solution to repair the fine defects in the dielectric layer and give an LC value of 9 μA/m$^2$. After repeating the operation of forming the semiconductor and repairing the dielectric layer six times (in the sixth time a voltage to give a final LC value of 10 μA/element was applied), the sintered body was washed and dried and the formation of the semiconductor layer as another electrode was completed. Thereafter, as described in Example 1, carbon paste and silver paste were stacked in this order to produce a chip capacitor.

EXAMPLE 9

From an electrochemically formed aluminum foil (thickness: 0.1 mm) of 125 μF/cm$^2$ by electrochemical formation at 8 V, a plurality of strips in a size of 6.0×3.3 mm were cut out and the 4.1×3.3 mm portion of each strip was again electrochemically formed at 80° C. for 30 minutes in an aqueous 20% ammonium adipate solution. Thereafter, each electrochemically formed foil was left standing at 20° C. for 3 hours in a chlorine gas diluted to 5% with nitrogen gas to produce fine electrical defective portions in the dielectric layer. The LC value of the dielectric layer having fine defective portions was 9 μA/m$^2$. Then, each electrochemically formed foil was dipped in an aqueous solution containing 0.2% ethylenedioxythiophene and 0.1 M anthraquinonesulfonic acid and a voltage of 7 V was applied between the electrochemically formed foil and a platinum electrode as a cathode at room temperature for 24 hours to form a semiconductor layer mainly comprising an ethylenedioxythiophene polymer. The resulting foil was pulled out, washed and dried and thereafter, a voltage of 5.5 V was applied by using the electrochemically formed foil as an anode and a platinum electrode as a cathode at 80° C. for 1.5 hours in an aqueous 0.1% acetic acid solution to repair the fine defects in the dielectric layer and give an LC value of 4 μA/m². After repeating the operation of forming the semiconductor and repairing the dielectric layer four times (in the fourth time a voltage to give a final LC value of 2 μA/element was applied), the foil was washed and dried and the formation of the semiconductor layer as another electrode was completed. Thereafter, as described in Example, carbon paste and silver paste were stacked in this order. Then, 6 sheets of the thus-obtained element were aligned to face the same direction and the silver paste sides were integrated by solidifying the silver paste. Furthermore, the element was placed on a lead frame in the same manner as in Example 1 and molded with an epoxy resin to produce a chip capacitor.

EXAMPLE 10

By using 0.08 g of partially-nitrided niobium powder (amount of nitrogen: 10,000 ppm) having CV of 82,000/g, a sintered body in a size of 4.0×3.4×1.7 mm was produced (sintering temperature: 1,320° C., sintering time: 30 minutes, density of sintered body: 3.5 g/c cm³, Nb lead wire: 0.29 mmφ). The sintered body excluding a part of the lead wire was dipped in an aqueous 0.1% phosphoric acid solution and electrochemically formed at 80° C. for 3 hours by applying a voltage of 20 V between the sintered body and a Ta plate electrode as a cathode to form a dielectric layer comprising $Nb_2O_5$. The resulting sintered body was alternately dipped in an aqueous 20% sodium molybdate solution and in an aqueous 10% hydrogenated sodium borate solution and this operation was repeated 30 times to attach a plurality of fine contacts mainly comprising molybdenum dioxide onto the dielectric layer. According to the observation by SEM, the fine contacts covered almost 15% of the dielectric layer. By attaching a plurality of fine contacts onto the dielectric layer, fine electrically defective portions were produced in the dielectric layer. The LC value of the dielectric layer having fine defective potions was 15 μA/m². Subsequently, the sintered body was dipped in an aqueous 10% alcohol solution containing 0.5% pyrrole and 0.1 M anthraquinonesulfonic acid and a voltage of 16 V was applied between the sintered body and a platinum electrode as a cathode at room temperature for 24 hours to form a semiconductor layer mainly comprising a pyrrole polymer. The resulting sintered body was pulled out, washed and dried and then, the fine defects in the dielectric layer were repaired in a solution of 0.1% acetic acid to give an LC value of 15 μA/m². After repeating the operation of forming the semiconductor and repairing the dielectric layer six times (in the sixth time a voltage to give a final LC value of 8 μA/element was applied), the sintered body was washed and dried and the formation of the semiconductor layer as another electrode was completed. Thereafter, as described in Example 1, carbon paste and silver paste were stacked in this order to produce a chip capacitor.

EXAMPLE 11

A capacitor was produced in the same manner as in Example 10 except that the molybdenum dioxide as a plurality of fine contacts attached to the dielectric layer was replaced by ethylenedioxythiophene polymer obtained by repeating the alternate dipping of the sintered body in an aqueous 0.2% ethylenedioxythiophene solution and in an aqueous 30% hydrogen peroxide solution. According to the observation by SEM, the fine contacts covered about 20% of the dielectric layer. In this Example, the final LC value was 12 μA/element after the operation of forming the semiconductor and repairing the dielectric layer was repeated six times.

COMPARATIVE EXAMPLE 2

A capacitor was produced in the same manner as in Example 1 except that the treatment with sulfuric acid-containing water vapor in Example 1 was not performed. The total time spent for the formation of the semiconductor layer was 96 hours similarly to Example 1.

COMPARATIVE EXAMPLE 3

A capacitor was produced in the same manner as in Comparative Example 2 except for changing the total time spent for the formation of the semiconductor layer in Comparative Example 2 to 200 hours.

The performance of each of the capacitors produced in Examples 1 to 11 and Comparative Examples 1 to 3 is shown together in Table 1.

TABLE 1

| | | Capacitance, μF | Coverage, % | ESR, Ω, at 100 kHz | LC, μA, at 4 V | LC after Mounting, μA, at 4 V |
|---|---|---|---|---|---|---|
| Examples | 1 | 470 | 98 | 18 | 8 | 9 |
| | 2 | 465 | 97 | 17 | 7 | 11 |
| | 3 | 471 | 98 | 19 | 10 | 12 |
| | 4 | 460 | 96 | 23 | 12 | 16 |
| | 5 | 444 | 93 | 26 | 17 | 21 |
| | 6 | 431 | 90 | 33 | 18 | 22 |
| | 7 | 467 | 97 | 20 | 9 | 11 |
| | 8 | 470 | 98 | 18 | 22 | 38 |
| | 9 | 95 | 94 | 16 | 2 | 3 |
| | 10 | 318 | 97 | 32 | 27 | 39 |
| | 11 | 317 | 97 | 30 | 29 | 40 |
| Comparative Examples | 1 | 325 | 68 | 46 | 42 | 83 |
| | 2 | 370 | 77 | 36 | 16 | 31 |
| | 3 | 468 | 97 | 22 | 46 | 98 |

As seen from comparison between Examples 1 to 6 and Comparative Example 1, when the LC value is set to 500 μA/surface area (m²) of the electrical conductor or less by performing electrical deterioration of the dielectric layer, the coverage of the semiconductor layer increases and the produced capacitor is improved in the LC value. Also, as seen from comparison between Example 1 and Comparative Example 2, when fine electrical defective portions are produced in the dielectric layer and then the semiconductor layer is formed on the dielectric layer by electrification, the coverage of the semiconductor layer increases in a relatively short time. Furthermore, as seen from comparison between Example 1 and Comparative Example 3, when the technique of the present invention that fine electrical defective portions are produced in the dielectric layer and then the semiconductor layer is formed on the dielectric layer by electrification is employed, the time necessary for the formation of the semiconductor layer is shortened and the absolute value of LC after mounting becomes small.

INDUSTRIAL APPLICABILITY OF THE INVENTION

The present invention provides a method for producing a capacitor, comprising producing fine electrically defective portions in the dielectric layer on the surface of one electrode and forming thereon a semiconductor layer working out to other electrode. According to the method of the present invention, a capacitor having good capacitance appearance factor, low ESR and excellent reliability can be obtained.

What is claimed is:

1. A method for producing a capacitor comprising, as one electrode, an electrical conductor having formed on the surface thereof a dielectric layer and, as the other electrode, a semiconductor layer, the method comprising producing fine electrically defective portions in the dielectric layer so as to form the dielectric layer having a LC value of 500 $\mu A/m^2$ or less per surface area of the electrical conductor and forming the semiconductor layer on the dielectric layer by electrification.

2. The method for producing a capacitor as claimed in claim 1, wherein the electrical conductor is at least one member selected from a metal, an inorganic semiconductor, an organic semiconductor and carbon.

3. The method for producing a capacitor as claimed in claim 1, wherein the electrical conductor is a laminate with a surface layer being at least one member selected from a metal, an inorganic semiconductor, an organic semiconductor and carbon.

4. The method for producing a capacitor as claimed in claim 1, wherein the semiconductor is at least one semiconductor selected from an organic semiconductor and an inorganic semiconductor.

5. The method for producing a solid electrolytic capacitor as claimed in claim 4, wherein the organic semiconductor is at least one selected from an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

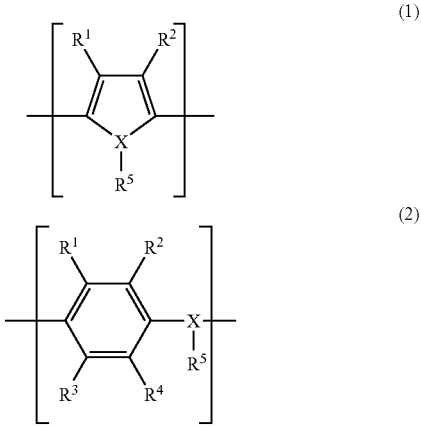

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs of $R^1$ and $R^2$, and $R^3$ and $R^4$ may combine with each other to form a ring structure.

6. The method for producing a solid electrolytic capacitor as claimed in claim 5, wherein the polymer containing a repeating unit represented by formula (1) is a polymer containing a structure unit represented by the following formula (3) as a repeating unit:

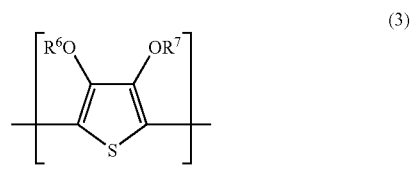

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

7. The method for producing a solid electrolytic capacitor as claimed in claim 5, wherein the polymer is selected from polyaniline, polyoxyphenylene, polyphenylene sulfide, polythiophene, polyfuran, polypyrrole, polymethylpyrrole, and substitution derivatives and copolymers thereof.

8. The method for producing a solid electrolytic capacitor as claimed in claim 7, wherein the polymer is poly(3,4-ethylenedioxythiophene).

9. The method for producing a solid electrolytic capacitor as claimed in claim 4, wherein the inorganic semiconductor is at least one compound selected from molybdenum dioxide, tungsten dioxide, lead dioxide and manganese dioxide.

10. The method for producing a capacitor as claimed in claim 1, wherein the dielectric material is at least one dielectric material selected from a metal oxide and a polymer.

11. The method for producing a capacitor as claimed in claim 10, wherein the metal oxide can be obtained by electrochemical formation of an electrical conductor comprising a metal element.

12. The method for producing a capacitor as claimed in claim 1, wherein the fine electrically defective portions formed in the dielectric layer are produced by bringing the electrical conductor having formed on the surface thereof a dielectric layer into contact with a corrosive gas or liquid capable of corroding the dielectric layer.

13. The method for producing a capacitor as claimed in claim 12, wherein the corrosive gas is a halogen gas, an acid or alkali component-containing water vapor, air, nitrogen or argon gas.

14. The method for producing a capacitor as claimed in claim 12 above, wherein the corrosive liquid is a solution obtained by incorporating a halogen component or an acid or alkali component into water or an organic solution.

15. The method for producing a capacitor as described in claim 1 above, wherein the fine electrically defective portions formed in the dielectric layer are produced by attaching fine contacts to the electrical conductor having formed on the surface thereof a dielectric layer.

16. The method for producing a capacitor as described in claim 15 above, wherein the fine contact is at least one member selected from a metal oxide, a salt, a transition element-containing inorganic compound, a transition element-containing organic compound and a polymer compound.

17. The method for producing a solid electrolytic capacitor as claimed in claim 1, wherein the semiconductor has an electrical conductivity of $10^{-2}$ to $10^3$ S/cm.

18. A capacitor produced by the production method claimed in any one of claims 1 to 17.

19. An electronic circuit using the capacitor claimed in claim 18.

20. An electronic device using the capacitor claimed in claim 18.

* * * * *